Patented Jan. 12, 1932

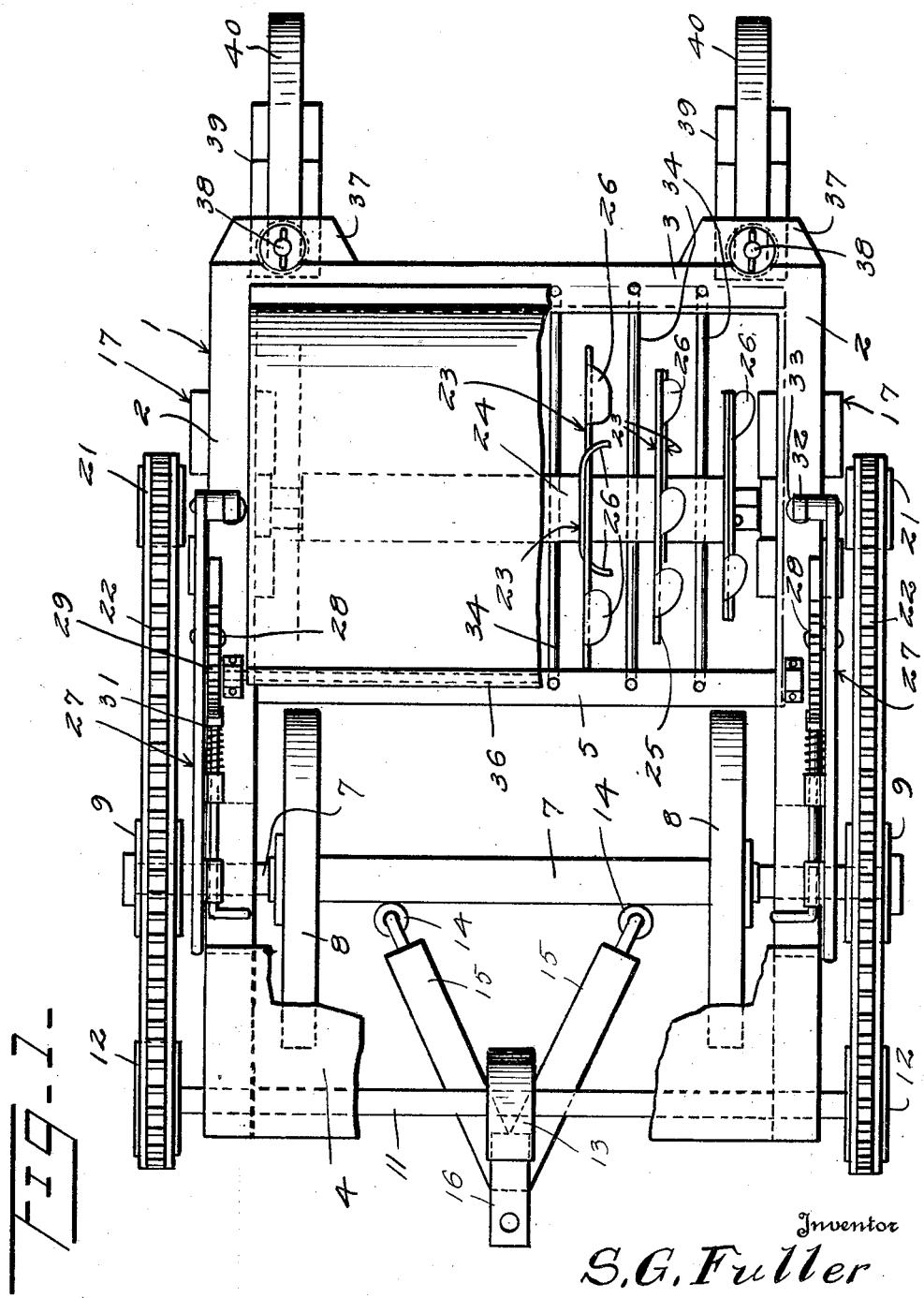

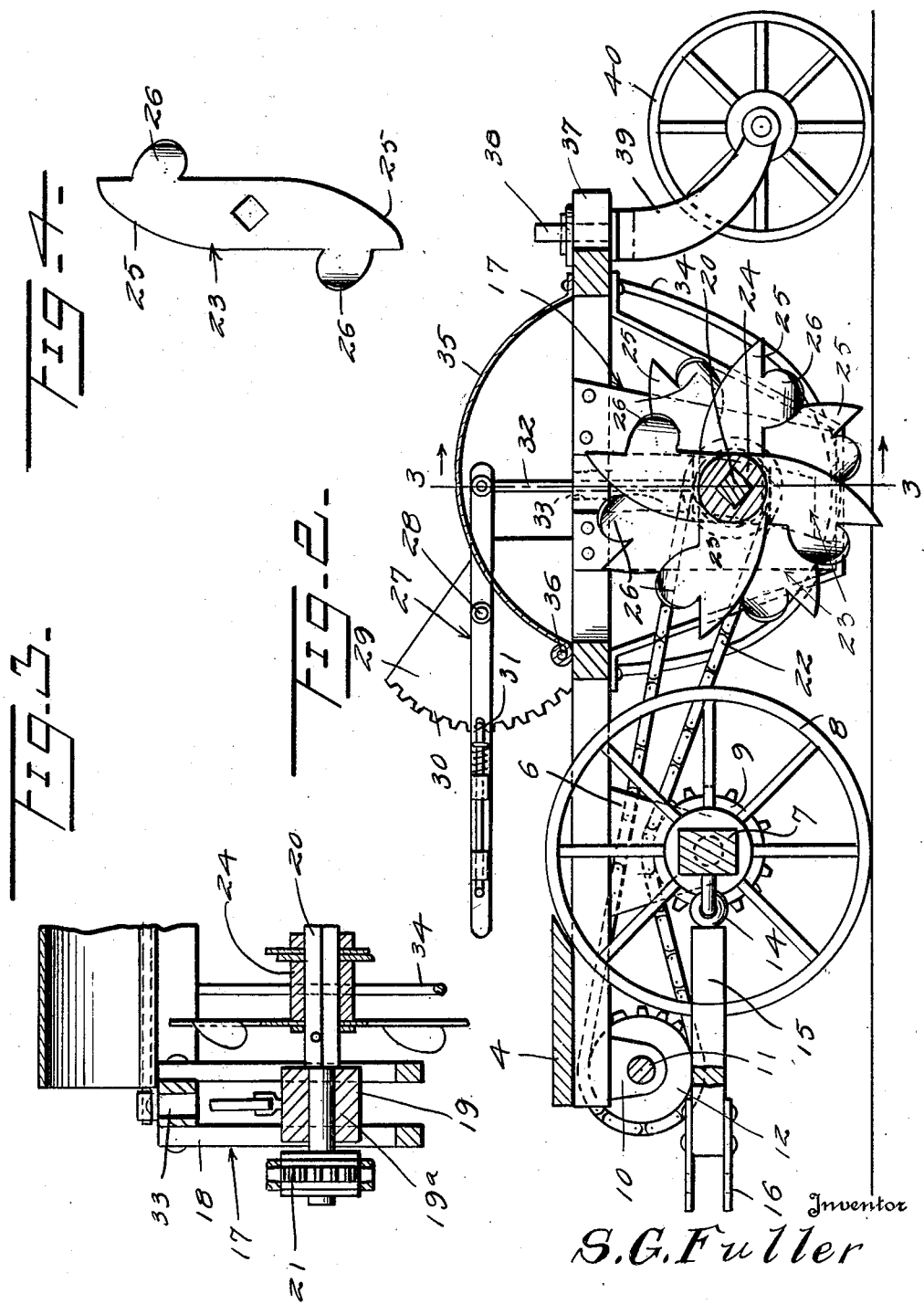

1,840,810

UNITED STATES PATENT OFFICE

SUMNER G. FULLER, OF GOODELL, IOWA

EARTH PULVERIZING MACHINE

Application filed May 6, 1930. Serial No. 450,256.

This invention relates to improvements in earth working machines and pertains particularly to a power driven machine designed for the purpose of digging up quack grass and other grasses and weeds which are difficult to eradicate, the primary object of the invention being to completely uproot these grasses, shake or knock the earth therefrom and leave the same lying upon the surface of the ground where the roots will be exposed to and destroyed by the rays of the sun.

Another object of the invention is to provide a machine for the purpose above described in which a plurality of rotating blades are employed which will spade up the earth and leave the same in a pulverized condition so that it will be unnecessary to harrow the ground before planting therein.

A still further object of the invention is to provide a machine employing a plurality of earth spading and turning blades, in which the blades are rotatably mounted and adapted to be vertically adjusted so that the depth of penetration may be regulated at will by the operator of the machine.

Other objects and advantages of the present invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in top plan of the implement embodying the present invention, a portion thereof being broken away.

Figure 2 is a view in longitudinal section of the machine showing the arrangement of the earth-working elements.

Figure 3 is a detailed sectional view taken substantially upon the line 3—3 of Figure 2.

Figure 4 is a detailed view in side elevation of one of the double blades of the device.

Referring more particularly to the drawings wherein like numerals of reference indicate corresponding parts throughout the several views, the numeral 1 indicates generally the frame of my machine, the same comprising a pair of side beams 2 and a rear cross beam 3, the front ends of the side beams 2 of the frame being connected by the platform 4. Intermediate their ends the side beams 2 are connected by a transverse brace beam 5.

Adjacent the forward end of each of the side beams 2 of the frame structure there is mounted a depending bearing 6. Through each of these bearings 6 passes one end of an axle 7 upon which is mounted a supporting traction wheel 8, there being one wheel adjacent each side of the vehicle frame as shown in Figure 1. The portion of the axle 7 lying between the traction wheels 8 is squared as shown so that the shoulders formed at the point of connection between the squared portion of the axle and each round end portion, serve as a stop for the adjacent wheel and maintain the latter in position.

Each of the axle ends extends outwardly beyond the bearing block through which it passes and has mounted to idle thereon a sprocket wheel 9.

A bearing is mounted upon the under face of each side beam 2 directly at the forward end thereof, that is forwardly of the bearing blocks 6 which carry the vehicle axle, each of these latter bearings being indicated by the numeral 10. Supported by the bearings 10 is a transverse power shaft 11 upon each end of which beyond the adjacent vehicle beam 2 a sprocket gear 12 is mounted. The shaft 11 further has mounted thereon a pulley wheel 13 which may have coupled therewith a drive belt for connecting the pulverizer with the power take-off mechanism of a tractor or other machine by which the pulverizer is being drawn.

In order to facilitate the attachment of the pulverizer to a draft vehicle the axle 7 is provided with a pair of eyes 14 to each of which is pivotally attached one end of one of a pair of forwardly converging bars 15, the connected convergent ends of which have secured thereto the apertured plates 16 which are maintained in spaced relation as shown in Figure 2 so that a convenient connection may be made with the draft clevis of a tractor.

To each of the side beams 2 adjacent its rear end there is attached a pair of spaced uprightly depending substantially U-shaped bearing block guides each of which is indicated as a whole by the numeral 17. The vertical recess formed between the upright portions of each of these guides bends slightly toward the front of the machine at its lower portion and the recesses of the guides carried by the two side beams are in alignment transversely of the machine. Slidably disposed in the recesses of and connecting each pair of members 17 is a shaft bearing block 19. Each block 19 has a guide pin 19a projecting from each of the opposite side faces thereof to extend between the spaced members 17 to prevent lateral movement of the block in the recesses 18. These blocks 19 support the ends of an earth working blade carrying shaft 20, the ends of this shaft extending beyond the supporting blocks 19 as shown in Figure 3 and having mounted thereon driven sprocket wheels 21. These sprocket wheels 21 are connected upon their respective sides of the machine with the drive sprockets 12 through the medium of a sprocket chain 22, one side of which passes over the adjacent idler sprocket 9 upon the vehicle axle 7.

Disposed upon the shaft 20 is a plurality of earth working blades each of which is indicated generally by the numeral 23, these blades being maintained in suitable spaced relation by collars 24. As shown the earth working blades 23 are double, that is each end of each is curved as indicated at 25 to form an earth penetrating edge and point, the curved edge at one end being oppositely directed from the curved edge of the opposite end of the blade and each of the blade ends has formed upon and projecting from its back edge a laterally curved mold board 26 which turns the cut earth over to one side as the adjacent blade end passes therethrough.

The depth of penetration of the points 25 of each of the earth working blades may be governed by the levers 27, each of which is disposed as shown above one of the side beams 2 of the machine frame, being pivotally mounted as at 28 upon and at the radial center of a toothed segment 29 with the toothed edge 30 of which a spring controlled dog 31 engages to hold the lever against oscillation.

The free end of each lever is connected by a bar 32 with an adjacent shaft bearing block 19, this bar passing downwardly through a suitable passage formed in the underlying beam 2 as indicated by the numeral 33.

In order to assist in the breaking up or pulverizing of the earth as it is turned up by the blades 23, there is suspended from the rear cross beam 3 and the transverse brace beam 5 a plurality of substantially U-shaped bars 34. Each of these bars as shown in Figure 1 lies between two groups of earth working blades 23 and each is fixed to maintain a certain distance from the earth so that it will not come into contact therewith but will be close enough thereto to cut through and break up the earth as it is turned up and over by the blade points and the mold boards forming a part thereof.

The battery of earth penetrating blades 23 is covered by an arcuate hood 35 which extends transversely of the machine frame as shown and is pivoted along one edge as at 36 to the transverse brace beam 5 of the machine while the other edge rests upon the cross beam 3.

At the central portion of the frame cross beam 3 a bearing 37 is formed for the reception of the vertical pivot pin 38 of a caster wheel fork 39, the wheel carried thereby being indicated by the numeral 40.

This wheel as will be readily seen supports the rear portion of the pulverizer and also permits the free turning thereof. While I have shown only one caster wheel at the rear of the machine I, of course, do not wish to be limited to the use of one wheel only for it will be readily obvious that any number of these wheels may be used if found desirable.

From the foregoing description it will be seen that with a machine of the character herein described the surface of the earth may be readily worked up and pulverized so that after the passage of the machine it will be in condition for planting. At the same time due to the action of the clod breaking bars 34 the grasses dug up by the blades 23 will be freed from the earth which is taken up with them and will have their roots laid bare to the sun's rays by which they will be killed.

Having thus described my invention, what I claim is:

1. In a machine of the character described, a wheel supported structure, a plurality of rotatably mounted plow-like blades adapted to cut into the earth and to turn up the same, and means cooperating with said blades for breaking up the earth clods turned up thereby.

2. An agricultural implement of the character described, comprising an ambulatory frame structure, a rotatable shaft extending transversely thereof, a plurality of earth working blades supported by said shaft and formed to turn the earth laterally as they pass therethrough, means for breaking up clods of earth as the same are turned up by said blades, and means for vertically adjusting said blades to govern the extent of penetration thereof into the earth.

3. An agricultural implement of the character described, comprising an ambulatory frame structure, a rotatable shaft extending transversely thereof, a plurality of earth working blades supported by said shaft and formed to turn the earth laterally as they pass therethrough, rigid elements carried by said structure between the blades and having a fixed relation to the underlying earth acting to break up clods of earth turned up by said blades, and means for vertically shifting the blades only to govern the extent of penetration of the same into the earth.

4. A wheeled structure including a frame, hanging bearing block guides carried by said frame, shiftable bearing blocks carried by said guides, a shaft supported by said blocks, means carried by the frame for raising or lowering said blocks in the guides, a plurality of earth working blades mounted in spaced relation upon said shaft, means for transmitting rotary motion to said shaft and blades from a source of power, and fixed frame like elements carried by said first mentioned frame and disposed between the blades in fixed relation to the earth in which the blades work, for breaking up clods of earth turned up by the blades.

5. An earth pulverizer, comprising a frame, supporting wheels therefor, a bearing block guide at each side of said frame, a shaft bearing block mounted at each guide for vertical movement, a shaft extending transversely of the pulverizer and having each end extended through a bearing block, adjustable means for vertically moving said bearing blocks, means for transmitting rotary motion to said shaft, a plurality of earth penetrating blades carried by said shaft in spaced relation thereon and each having an earth turning element, and a plurality of substantially U-shaped frames depending from the underside of the pulverizer frame and disposed between the earth penetrating blades.

6. An earth pulverizing machine, comprising a frame, wheel supporting means for the frame, a pair of depending bearing block guide frames disposed in spaced relation at each side of said first frame, a bearing block disposed in and connecting said guides for vertical movement therein, means carried by each bearing block extending between the adjacent guides for maintaining it in position, a shaft extending transversely of the machine and having its ends extended through said blocks, a sprocket wheel upon one end of said shaft, means for transmitting rotary power to said shaft through the sprocket wheel, a plurality of radially extending blades carried by said shaft in spaced relation thereon, means carried by the frame and connected to said bearing blocks for vertically shifting the same, and a plurality of rigid substantially U-shaped frames carried by the first mentioned frame and straddling said shaft and each positioned between a pair of spaced blades, each of said blades having means for turning earth laterally as the blade passes therethrough.

7. An earth working blade for an implement of the character described, comprising an elongated flat body having an aperture intermediate its ends for the reception of a supporting shaft and further having opposite longitudinal end edges rounded to extend to the adjacent longitudinal edge to form oppositely directed earth penetrating edges and points, and a mold board formed upon each longitudinal edge opposite a curved rounded edge and inwardly from the adjacent point.

8. An earth pulverizing machine, comprising a frame, wheel supporting means for the frame, a shaft disposed transversely of the frame and mounted for rotation, a plurality of earth penetrating blades carried by and projecting radially from said shaft, means for rotating the shaft, each of said blades being formed to turn the earth laterally as it works thereinto, and a plurality of frame members straddling said shaft and disposed between the blades, each of said frames having a portion thereof adjacent the ground to engage and grind up the earth turned up by the blades.

9. An earth pulverizing machine, comprising a frame, wheel supporting means for the frame, a shaft disposed transversely of the frame and mounted for rotation, a plurality of earth penetrating blades carried by and projecting radially from said shaft, means for rotating the shaft, each of said blades being formed to turn the earth laterally as it works thereinto, a plurality of frame members straddling said shaft and disposed between the blades, each of said frames having a portion thereof adjacent the ground to engage and grind up the earth turned up by the blades, and means for shifting the blades vertically between the frames.

In testimony whereof I hereunto affix my signature.

SUMNER G. FULLER.